(12) United States Patent
Ignacio et al.

(10) Patent No.: US 9,495,396 B2
(45) Date of Patent: Nov. 15, 2016

(54) INCREASED DATABASE PERFORMANCE VIA MIGRATION OF DATA TO FASTER STORAGE

(71) Applicant: International Business Machines Corporation, Armonk, NY (US)

(72) Inventors: Rizaldy G. Ignacio, Castleknock (IE); Ken Maycock, Lucan (IE); Gary F. Murtagh, Dublin (IE); Shay Roe, Lucan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 380 days.

(21) Appl. No.: 13/967,403

(22) Filed: Aug. 15, 2013

(65) Prior Publication Data

US 2014/0089257 A1    Mar. 27, 2014

(30) Foreign Application Priority Data

Sep. 24, 2012  (GB) .................................. 1216983.5

(51) Int. Cl.
*G06F 17/30*    (2006.01)
(52) U.S. Cl.
CPC .................. *G06F 17/303* (2013.01)
(58) Field of Classification Search
CPC .................................................. G06F 17/303
USPC ........................................................ 707/609
See application file for complete search history.

(56) References Cited

U.S. PATENT DOCUMENTS

| | | | |
|---|---|---|---|
| 5,664,187 A | 9/1997 | Burkes et al. | |
| 6,233,607 B1 | 5/2001 | Taylor et al. | |
| 6,591,262 B1 | 7/2003 | MacLellan et al. | |
| 6,721,794 B2 | 4/2004 | Taylor et al. | |
| 7,174,421 B2 | 2/2007 | Ehrlich | |
| 7,281,004 B2 | 10/2007 | Lightstone et al. | |
| 7,302,422 B2 | 11/2007 | Bossman et al. | |
| 7,363,451 B2 | 4/2008 | Kolli et al. | |
| 7,428,622 B2 | 9/2008 | Tulyani | |

(Continued)

FOREIGN PATENT DOCUMENTS

| | | |
|---|---|---|
| EP | 1396846 | 6/2010 |
| WO | WO2008002627 | 1/2008 |
| WO | WO2010099992 | 9/2010 |

OTHER PUBLICATIONS

"Best Practices Multi-temperature Data Management", Maksym et al., May 9, 2011.*

(Continued)

*Primary Examiner* — Etienne Leroux
*Assistant Examiner* — Cindy Nguyen
(74) *Attorney, Agent, or Firm* — Cantor Colburn LLP (57) ABSTRACT

According to an aspect, a computer implemented method for managing a database in real-time is provided. The method includes scanning for predetermined data in a predetermined workload stream during real-time operation of the database, and determining a workload priority for located predetermined data according to one or more workload rules. A storage priority of located predetermined data is determined according to a physical location of the located predetermined data. The located predetermined data are moved during the real-time operation of the database to a different physical location if the storage priority and the workload priority do not match.

20 Claims, 9 Drawing Sheets

(56) References Cited

U.S. PATENT DOCUMENTS

| | | | |
|---|---|---|---|
| 7,499,908 | B2 | 3/2009 | Elnaffar et al. |
| 7,567,990 | B2 | 7/2009 | Mitchell et al. |
| 7,627,778 | B2 | 12/2009 | Chen et al. |
| 7,664,847 | B2 | 2/2010 | Colrain et al. |
| 8,429,346 | B1* | 4/2013 | Chen et al. .............. 711/114 |
| 2005/0038833 | A1 | 2/2005 | Colrain et al. |
| 2005/0122610 | A1 | 6/2005 | Ehrlich |
| 2007/0299812 | A1 | 12/2007 | Salch |
| 2008/0270672 | A1 | 10/2008 | Kowa |
| 2008/0281939 | A1 | 11/2008 | Frazier et al. |
| 2009/0164843 | A1 | 6/2009 | Wei et al. |
| 2010/0313076 | A1 | 12/2010 | Wei et al. |
| 2011/0167230 | A1 | 7/2011 | Quan et al. |
| 2012/0011312 | A1* | 1/2012 | Dorfman ............. G06F 1/3221 711/113 |
| 2012/0303929 | A1* | 11/2012 | Chiu et al. .............. 711/173 |

OTHER PUBLICATIONS

J. Seeger, et al., "DB2 V10.1 Multi-temperature Data Management Recommendations," published Apr. 2012, available on-line at http://public.dhe.ibm.com/software/dw/data/dm-1205multitemp/DB2V10_Multi-Temperature_0412.pdf, 48 pages.

Applicaton No. GB1216983.5, Search Report dated Jan. 10, 2013, 3 pages.

IBM DB2 Database for Linux, UNIX and Windows Information Center, May 9, 2013, "Introduction to workload management concepts," 4 pages.

IBM DB2 Database for Linux, UNIX, and Windows Information Center, Jul. 25, 2013 "Migrating from Query Patroller to DB2 workload manager," 6 pages.

S. Krompass, et al., "Quality of Service-Enabled Management of Database Workloads," Copyright 2008 IEEE, Bulletin of the IEEE Computer Society Technical Comittee on Data Engineering, Mar. 2009, 8 pages.

* cited by examiner

| Data temperature | Data temperature characteristics | Typical data age |
|---|---|---|
| Hot | Tactical and OLTP type data – current data that is accessed frequently by queries that must have short response times. For example, high volume, small result set point queries in operational data stores (ODS). | 0 - 3 months and aggregates or summaries of this data |
| Warm | Traditional decision support type data – data that is accessed less frequently and by queries that most likely do not require short response times. | 3 - 13 months and aggregates or summaries of this data |
| Cold | Deep historical and legacy data – data that is typically accessed infrequently. | 13 months - 5 years |
| Dormant | Regulatory type or archival data – data that is accessed infrequently and that is never updated. | Over 5 years |

INCREASED DATABASE PERFORMANCE VIA MIGRATION OF DATA TO FASTER STORAGE

PRIORITY

The present application claims priority to Great Britain Patent Application No. 1216983.5, filed on Sep. 24, 2012, and all the benefits accruing therefrom under 35 U.S.C. §119, the contents of which in its entirety are herein incorporated by reference.

BACKGROUND

This disclosure relates to database systems and more particularly to improving performance in a relational database management system.

Businesses are retaining data for longer periods of time to support business analysis and to expedite decision making to meet the increasing business demands and regulatory compliance requirements. Data warehouses are typically offering 100 terabyte+ to customers in order to meet this; however, given the high cost associated with enterprise storage, it is a challenge for a database administrator to justify the need to move the entire warehouse to faster leading-edge storage and delegate the slower (but still expensive) hardware for in-house testing. The advent of solid-state drives further accelerates the need for tiered storage where some data resides on the faster solid-state drives while other data resides on slower storage.

A multi-temperature solution, such as the one provided in IBM DB2 Version 10 provides the capability to store data in a tiered fashion with portions of "hot" data being stored on faster solid-state drives or high speed magnetic disk storage while "cooler" data are stored on slower storage in effect reducing the total cost of ownership regarding disk storage in a relational database management system where the solution is manually administered. Apportionment of data to appropriate faster or slower storage based on quality of service expectations is reliant on the database administrator's knowledge and understanding of the data on an ongoing basis. IBM and DB2 are registered trademarks of International Business Machines Corporation in the United States and/or other countries.

DB2 Workload Manager (WLM) is a key component of the DB2 relational database software product. WLM is a workload manager that identifies, manages and monitors different activity streams within a DB2 database environment. Currently a database administrator has to understand the data in the RDBMS and manually apportion data into faster storage based off any WLM prioritization that may be in place. Any alterations to WLM prioritization will require manual movement of data to accommodate the updated WLM rules.

SUMMARY

According to an embodiment, a computer implemented method for managing a database in real-time is provided. The method includes scanning for predetermined data in a predetermined workload stream during real-time operation of the database, and determining a workload priority for located predetermined data according to one or more workload rules. A storage priority of located predetermined data is determined according to a physical location of the located predetermined data. The located predetermined data are moved during the real-time operation of the database to a different physical location if the storage priority and the workload priority do not match.

According to another embodiment, a database management system is provided. The database management system includes a workload stream scanner to scan for predetermined data in a predetermined workload stream during real-time operation of a database, and a workload priority engine to determine a workload priority for located predetermined data according to one or more workload rules. The database management system also includes a storage priority engine to determine a storage priority of located predetermined data according to a physical location of the located predetermined data. The database management system further includes a data migration engine to move the located predetermined data during the real-time operation of the database to a different physical location if the storage priority and the workload priority do not match.

According to a further embodiment, a computer program product for managing a database is provided. The computer program product includes a computer readable storage medium having computer readable program code embodied therewith. The computer readable program code includes computer readable program code configured for scanning for predetermined data in a predetermined workload stream during real-time operation of the database, and determining a workload priority for located predetermined data according to one or more workload rules. A storage priority of located predetermined data is determined according to a physical location of the located predetermined data. The located predetermined data are moved during the real-time operation of the database to a different physical location if the storage priority and the workload priority do not match.

DETAILED DESCRIPTION

Figure 1:
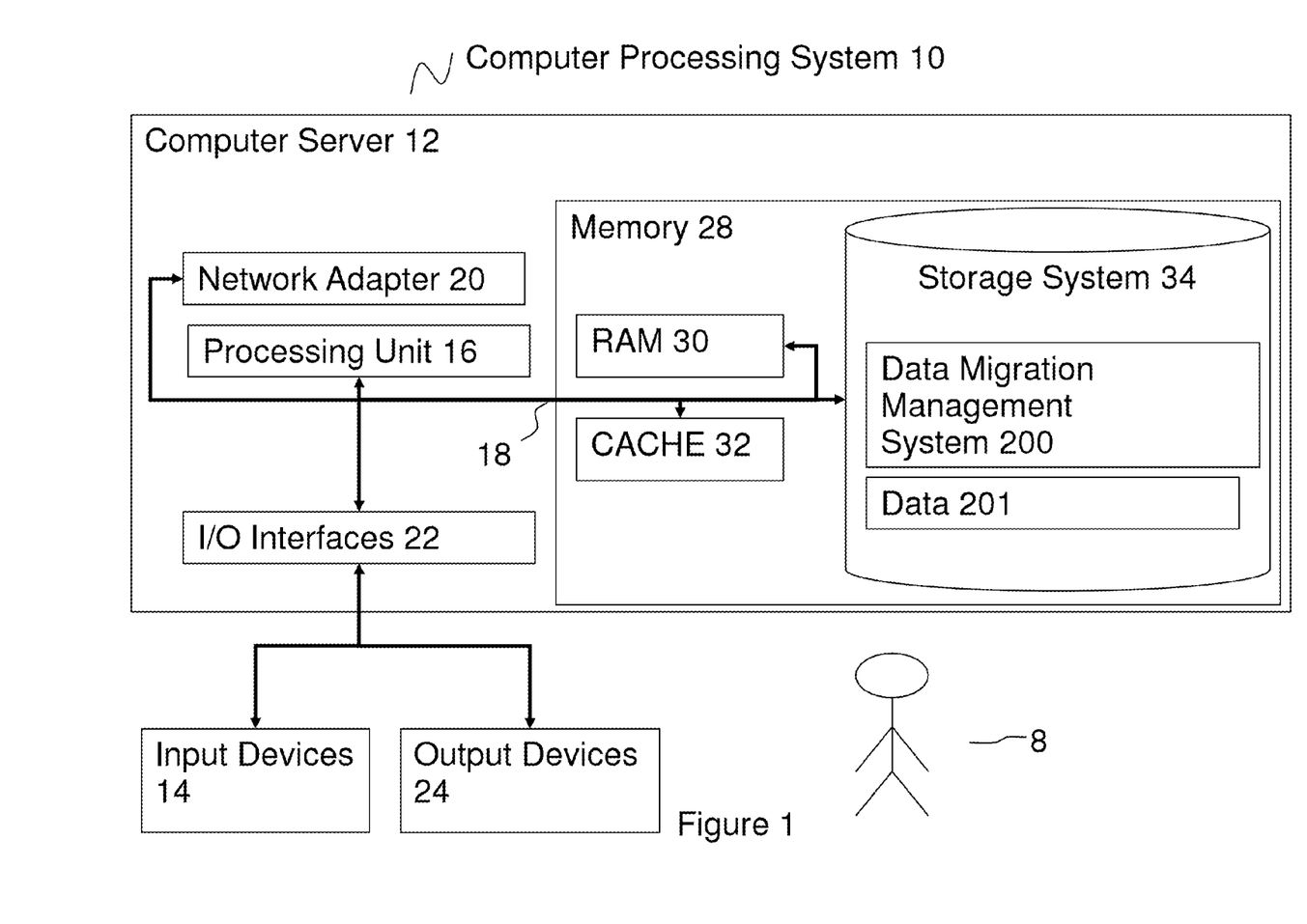
FIG. 1 is a deployment diagram of a data migration management system according to an embodiment.

Referring to FIG. 1, a deployment diagram of an exemplary embodiment in a computer processing system 10 is depicted. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer system. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices. As shown in FIG. 1, computer processing system 10 is shown in the form of a general-purpose computer server 12. The components of computer server 12 may include, but are not limited to, processing unit 16, memory 28, and bus 18.

Bus 18 couples together computer server components including memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer processing system 10 typically includes a variety of computer system readable media. Such media may be any available media that is accessible by computer processing system 10, and it includes both volatile and non-volatile media, removable and non-removable media.

Memory 28 includes computer system readable media in the form of volatile memory, such as random access memory (RAM) 30 and cache memory 32, and in the form of non-volatile or persistent storage system 34. Computer processing system 10 may further include other removable and/or non-removable, volatile and/or non-volatile computer system storage media. By way of example only, storage system 34 can be provided for reading from and writing to a non-removable, non-volatile media (not shown and typically a hard drive or solid-state drive). Although not shown, further storage media may be provided including: an external port for removable, non-volatile solid-state memory; and an optical disk drive for reading from or writing to a removable, non-volatile optical disk such as a CD, DVD or Blu-ray disc. In such instances, each can be connected to bus 18 by one or more data media interfaces. As will be further depicted and described below, memory 28 may include at least one program product having a set (for example, at least one) of program modules that are configured to carry out the functions of embodiments.

In an exemplary embodiment, program modules comprise data migration management system 200 and data 201. Data migration management system 200 and data 201 are stored in storage system 34, by way of example and not limitation, as well as an operating system, one or more application programs, a database management system and other program modules. Each of the operating system, one or more application programs, other program modules, and program data or some combination thereof, may include an implementation of a networking environment. Data migration management system 200 is provided to carry out the functions and/or methodologies of the embodiments as described herein. Data 201 is provided to carry example data for the embodiments as described herein.

Computer processing system 10 communicates with input devices 14 and output devices 24 via I/O interface 22. Input devices 14 can include a keyboard, a pointing device, a scanner and any device converting user input to signal data. Output devices 24 include a display, printer, speaker or any device converting signal data to output for the user. Still yet, computer processing system 10 can communicate with one or more networks such as a local area network (LAN), a general wide area network (WAN), and/or a public network (for example the Internet) via network adapter 20. As depicted, network adapter 20 communicates with the other components of computer server 12 via bus 18. It should be understood that although not shown, other hardware and/or software components could be used in conjunction with computer processing system 10. Examples, include, but are not limited to: microcode, device drivers, redundant processing units, external disk drive arrays, RAID systems, tape drives, and data archival storage systems.

Figure 2:
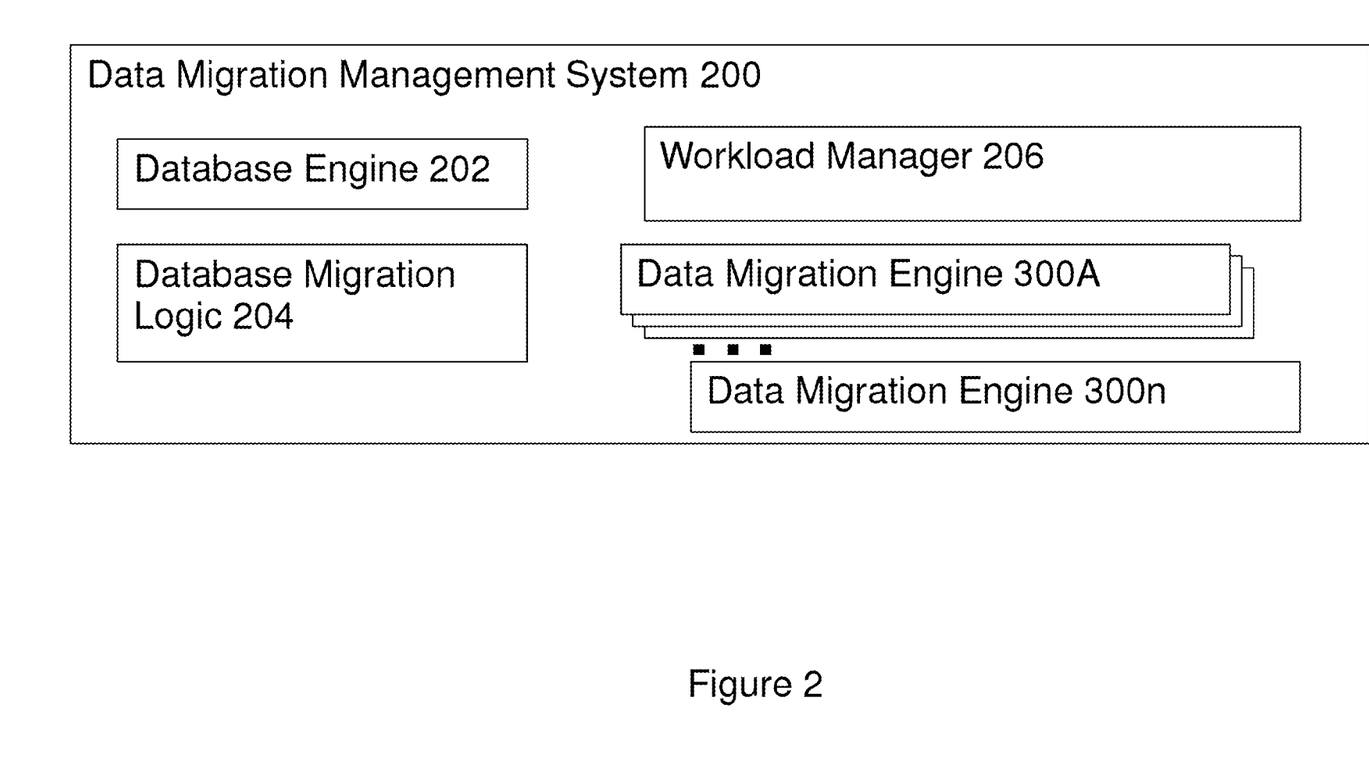
FIG. 2 is a component diagram of a data migration management system of an embodiment.

Referring to FIG. 2, data migration management system 200 comprises: database engine 202; database migration logic 204; workload manager 206; and data migration engines 300A-300n.

Database engine 202 provides common multi-temperature database functions and systems.

Database migration logic 204 provides the mechanism to move individual table spaces from one storage group to another.

Workload manager 206 provides mechanisms for identifying, managing and monitoring different workload streams.

Data migration engines 300A-300n provide the function for migrating data to different storage groups according to an exemplary embodiment. Each engine identifies incoming workload requests based off a unique set of rules set by the database administrator. Data migration engines 300A-300n are instantiated from data migration engine class 300.

Figure 3:
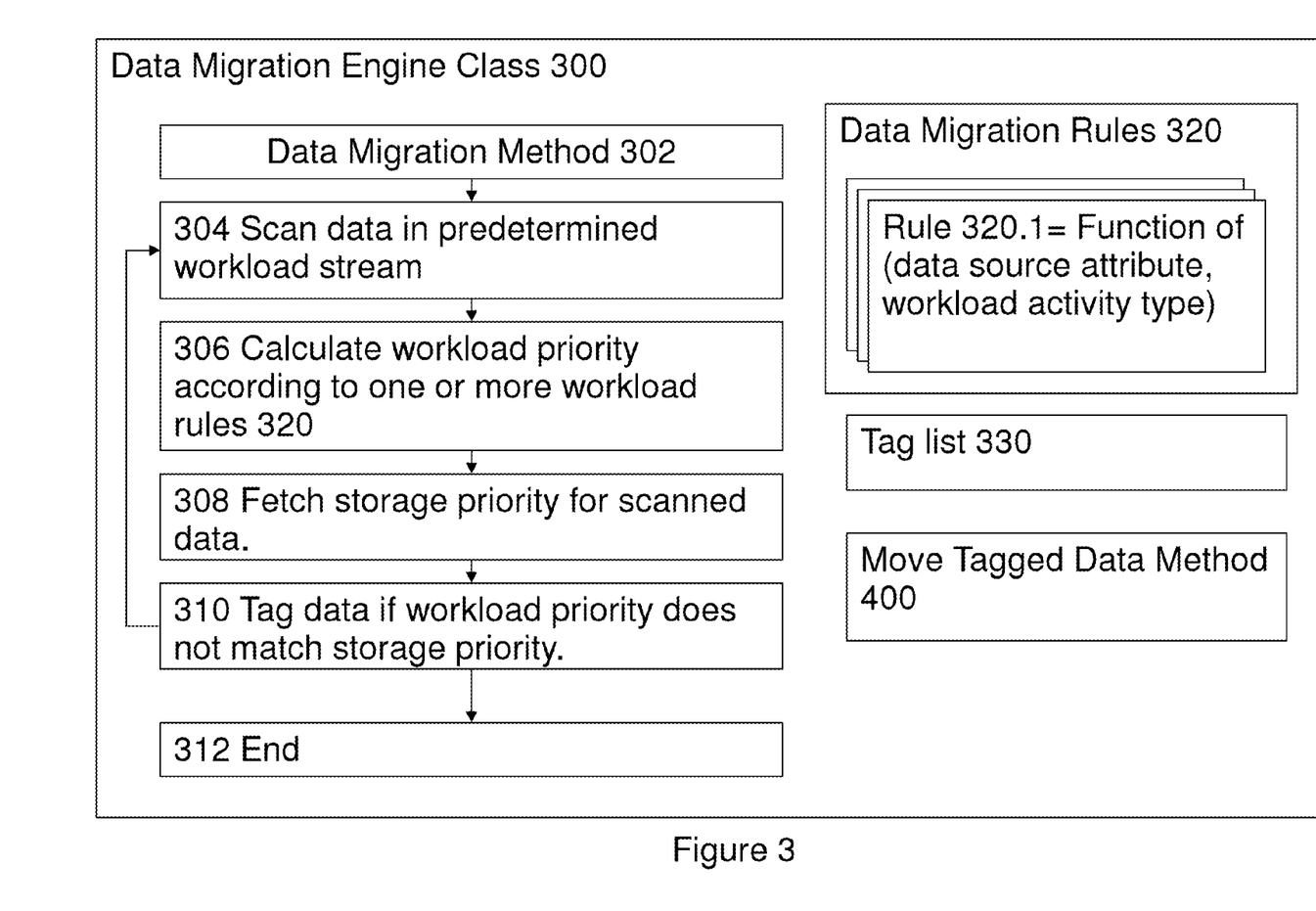
FIG. 3 is a component diagram of a data migration engine according to an embodiment.

Referring to FIG. 3, data migration engine class 300 comprises: data migration method 302; data migration rules 320; tag list 330; and move tagged data method 400.

Data migration rules 320 are unique for each data migration engine.

Tag list 330 is a data structure for holding a list of tagged data for moving.

Data migration method 302 comprises logical process blocks 304 to 312.

Block 304 is for scanning data in predetermined workload stream.

Block 306 is for calculating workload priority according to one or more workload rules 320.

Block 308 is for fetching storage priority for scanned data.

Block 310 is for tagging data if workload priority does not match storage priority. Data tags are compiled in tag list 330. Tags can contain the old and new priority of the data.

Block 312 is the end of the method.

Figure 4:
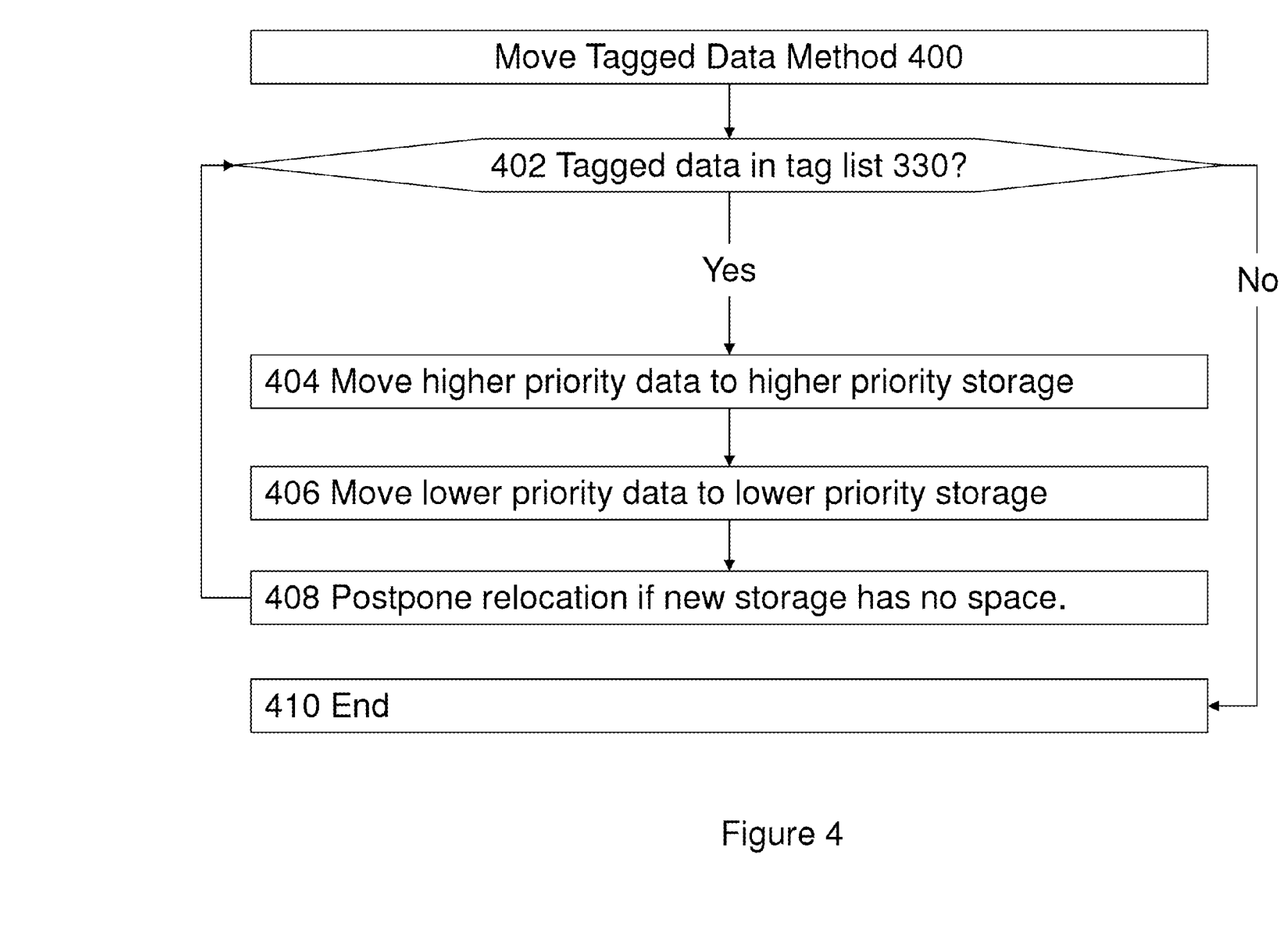
FIG. 4 is a method diagram of a data moving method according to an embodiment.

Referring to FIG. 4, move tagged data method 400 is the same for each data migration engine and comprises logical process blocks 402 to 410. Move tagged data method 400 is for moving the tagged data to a physical storage that matches the workload priority. Move tagged data method 400 operates asynchronously from the data migration method 302.

Block 402 is for locating a data tag in tag list 330. A data tag is a reference to a table space that has been determined as needing migration to appropriate storage. For each data tag located the process continues at block 404 else the process ends at block 410.

Block 404 is for moving higher priority tagged data to higher priority storage if the data tag indicates this. A write request is made to the higher priority storage. The address for the data is updated and the previous copy of the data is forgotten or erased.

Block 406 is for moving lower priority data to lower priority storage if the data tag indicates this. A write request is made to the lower priority storage. The address for the data is updated and the previous copy of the data is forgotten or erased.

Block 408 is for postponing relocation of the tagged data if the new storage has no space. If a null or negative response is returned after the write request then the relocation operation is postponed. Only if a positive response is returned is the relocation of the tagged data considered performed.

Block 410 is the end of method 400.

Figure 5:
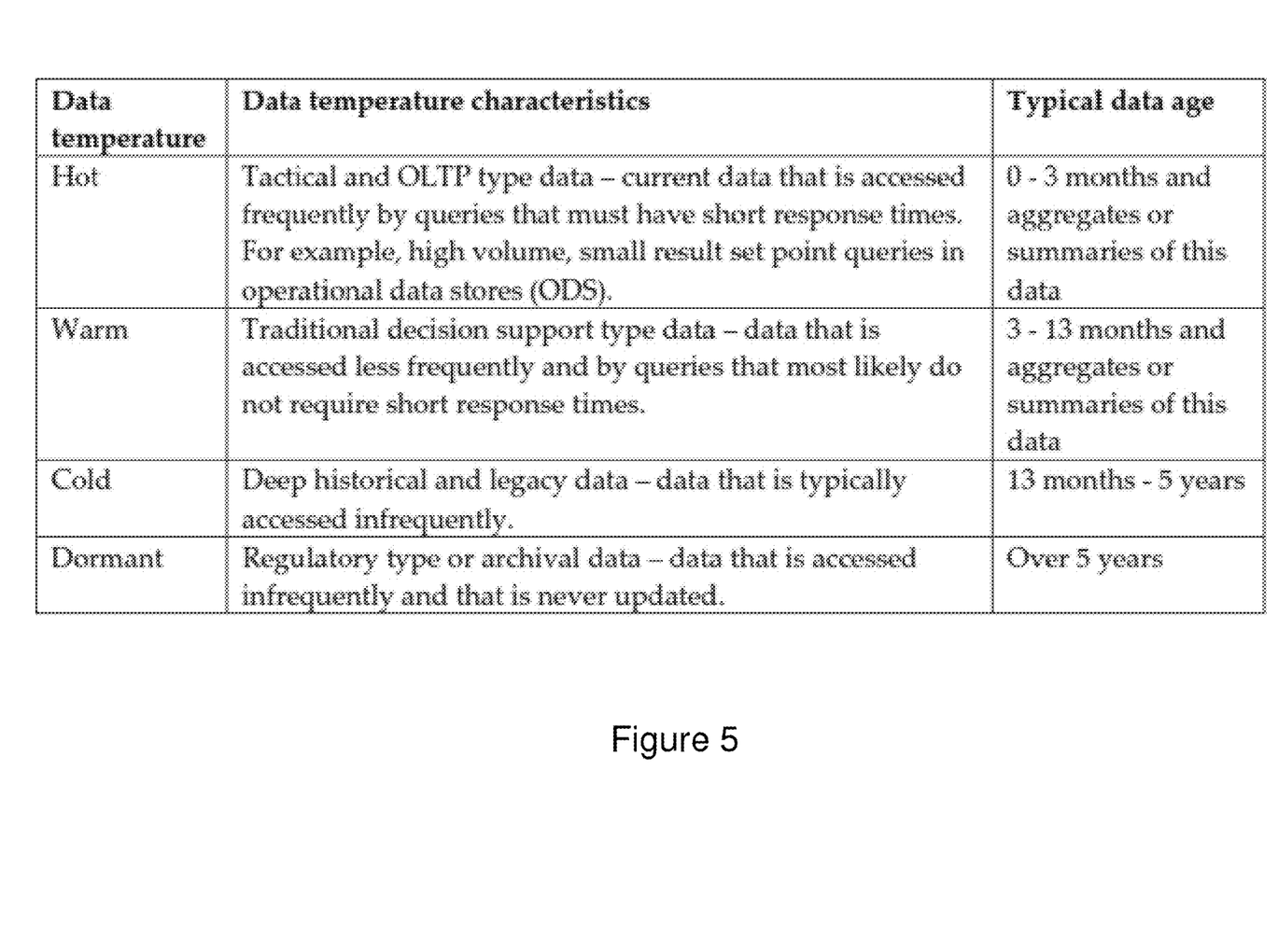
FIG. 5 is a table of categories used in a multi-temperature database.

Referring to FIG. 5, an example classification of data in a data warehouse according to its temperature is described in table form. The temperature of data is based on how old it is, how often it is accessed, how volatile it is, and how important the performance of the query that accesses the data is. Hot data are frequently accessed and updated, and users expect optimal performance when they access this data. Cold data are rarely accessed and updated, and the performance of the queries that access this data is not essential. Using faster, more expensive storage devices for hot data and slower, less expensive storage devices for cold data optimizes the performance of the queries that matter most while helping to reduce overall cost. An exemplary embodiment presents a strategy for managing a multi-temperature data warehouse by movement of data on different types of storage devices based on the temperature of the data. An exemplary embodiment is based on a multi-temperature data warehouse system such as version 10.1 or later of IBM DB2.

In general, the most recent data in a warehouse is much more likely than older data to be accessed by queries and maintenance processes or to be updated and therefore be hot. As time goes by, hot data tends to cool off, becoming warm data and later cold data, meaning that the probability that users access or update this data significantly decreases. The cold data must still be available, however, for regulatory requests, audits, and long-term research.

Another important characteristic of requests for colder data is that users do not typically insist on optimal performance for these requests. Since strong performance for these queries is not essential, colder data can be placed on slower, less expensive types of storage devices. A warehouse can contain several different temperature tiers (hot, warm, cold, dormant) In general, the number of temperature tiers is tied to the number of different types of storage devices that are attached to the warehouse. For example, hot data might be stored on new, solid-state drives; warm data on new, high speed magnetic storage devices; and cold and dormant data on older, less efficient magnetic storage devices.

The definition of each data temperature depends on the specific environment, but data temperatures usually fall into fairly common categories. The table provides some guidelines for classifying data by temperature: hot data; warm data; cold data; and dormant data. Hot data are typically tactical and frequently accessed by queries that must have short response times, for example online transactional processing (OLTP) type data and high volume, small result set, point queries in operational data stores (ODS). Hot data have a typical age of 0 to 3 months including aggregates and summaries of this data. Warm data are typically traditional decision support type data, data that are accessed less frequently and by queries that most likely do not require short response times. Warm data have a life of 3 to 13 months including aggregates and summaries of this data. Cold data are typically deep historical and legacy data, data that are typically accessed infrequently. Cold data have a typical age of 13 months to 5 years. Dormant data are typically regulatory type or archival data, data that are accessed infrequently and that are never updated. Dormant data have a typical age of over 5 years.

Figure 6:
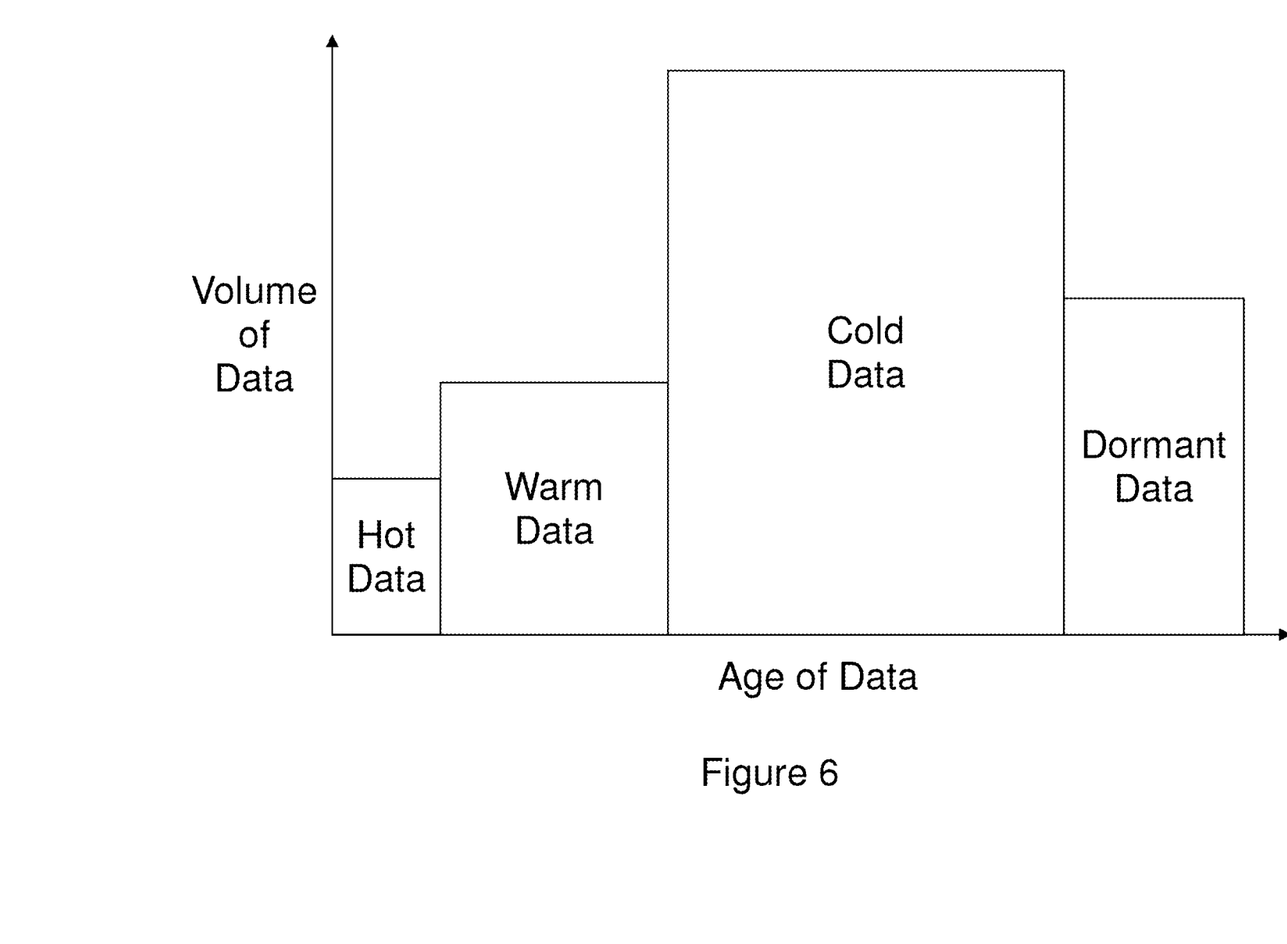
FIG. 6 is a graph showing an example relationship between data storage groups, data age and data volume.

Referring to FIG. 6, an example graph shows a typical distribution of example temperature classifications across temperature tiers. As data ages, the average temperature of the data tends to cool off There can be temperature fluctuations, or hot spots, as users perform periodic analysis, such as an analysis of the current quarter compared to the same quarter last year. But typically a small proportion of the data in a warehouse is considered hot or warm and 70% to 90% of the data are considered cold or dormant.

Classification of data into temperature tiers is also affected by the business rules that dictate how an organization moves data between the parts of the warehouse that supports the data of a particular temperature. For example, an organization's reports focus on quarterly data and always compare the net sales at the end of each fiscal month to the net sales during the same month for the previous year. Such a business rule implies that the definition of hot data should include the most recent three fiscal months and warm data should include the next ten fiscal months. When the end of the month reporting is performed, the thirteenth fiscal month can be moved back into hot storage so your reports run optimally. After the reports are complete, the thirteenth fiscal month can be moved back to warm or cold storage.

Figure 7:
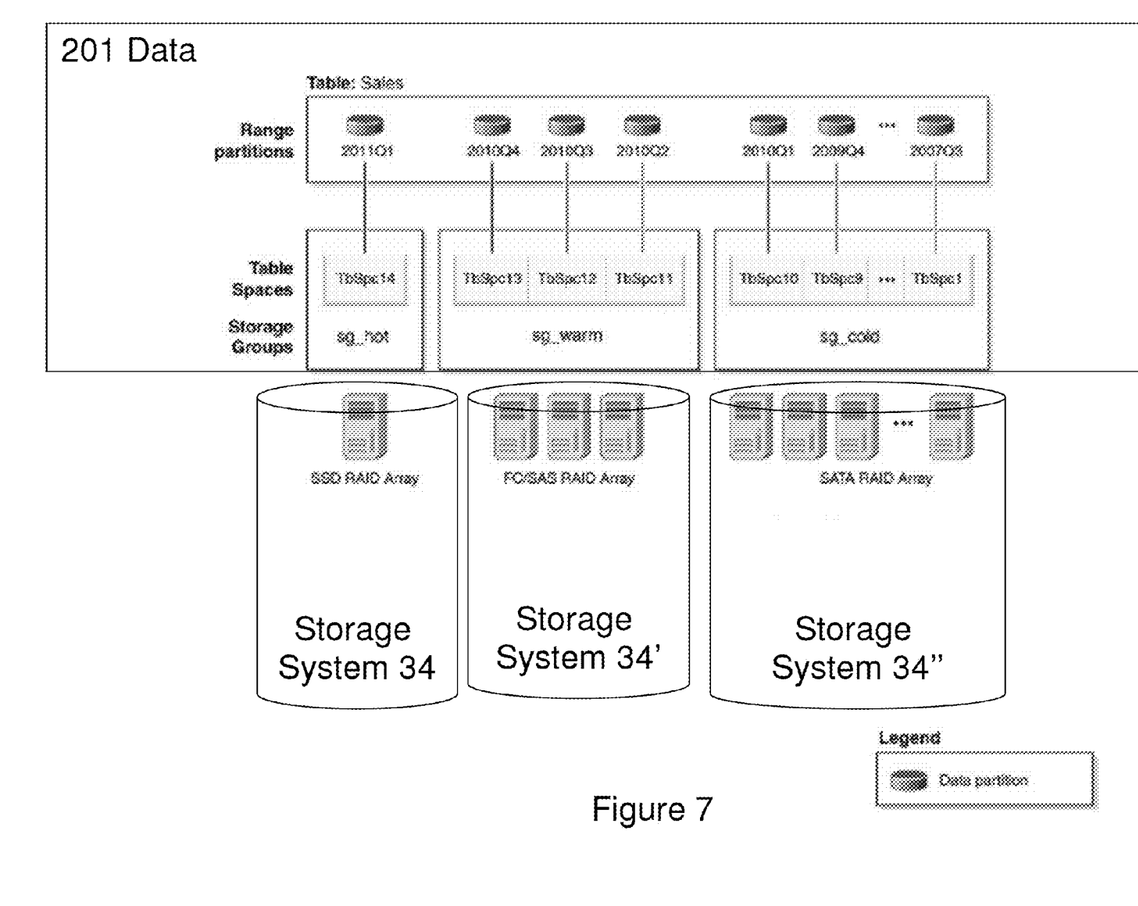
FIG. 7 is a data and storage diagram showing data storage groups and corresponding storage systems of a multi-temperature data storage solution.

Referring to FIG. 7, three example tiers of storage system 34, 34' and 34" (SSD, Fibre Channel System Attached Storage and Serial AT Attachment (SATA)) store example data (for example sales tables) and three storage groups are defined. The best response times are needed when accessing the most recent data (for example data tables from the most recent accounting quarter). Thus, hot data are placed on the fastest storage (storage system 34). The response times of the next three most recent quarters needs to be good, but not as fast as the current quarter, therefore warm data are placed on slower storage (storage system 34'). Finally, the remainder of the data is not accessed as frequently and the response time can be longer, ideal for cold data so these data are stored on considerably slower storage (storage system 34"). In such a configuration, most of the data are stored on the least expensive storage while allowing service level agreements on the more recent data to be satisfied. Therefore, the overall total cost of ownership for the warehouse is improved.

A range partition is a portion of a table that is spread across multiple storage objects based on one or more defined table columns (typically a date or time column) This data organization schema is known as table partitioning, range partitioning or data partitioning (not to be confused with database partitioning). The example range partitions could be: 2011Q1; 2010Q4; 2010Q3; 2010Q2; 2010Q1; 2009Q4 . . . 2007Q4.

A storage group is a named set of storage paths on which IBM DB2 V10.1 data can be stored. The storage paths have a common set of media attributes. The example storage groups are: sg_hot; sg_warm; and sg_cold.

A table space is a storage structure that can contain tables, indexes, large objects, and long data. Table spaces organize data in a database into logical storage groupings that relate to where data are stored on a system. A table space can belong to only a single database partition group. Automatic storage managed table spaces can be assigned to a specific storage group based on the temperature of the data in the table space. The example table spaces comprise: TbSpc14; TbSpc13, TbSpc12, TbSpc11, TbSpc10, TbSpc9 . . . TbSpc1.

Figure 8:
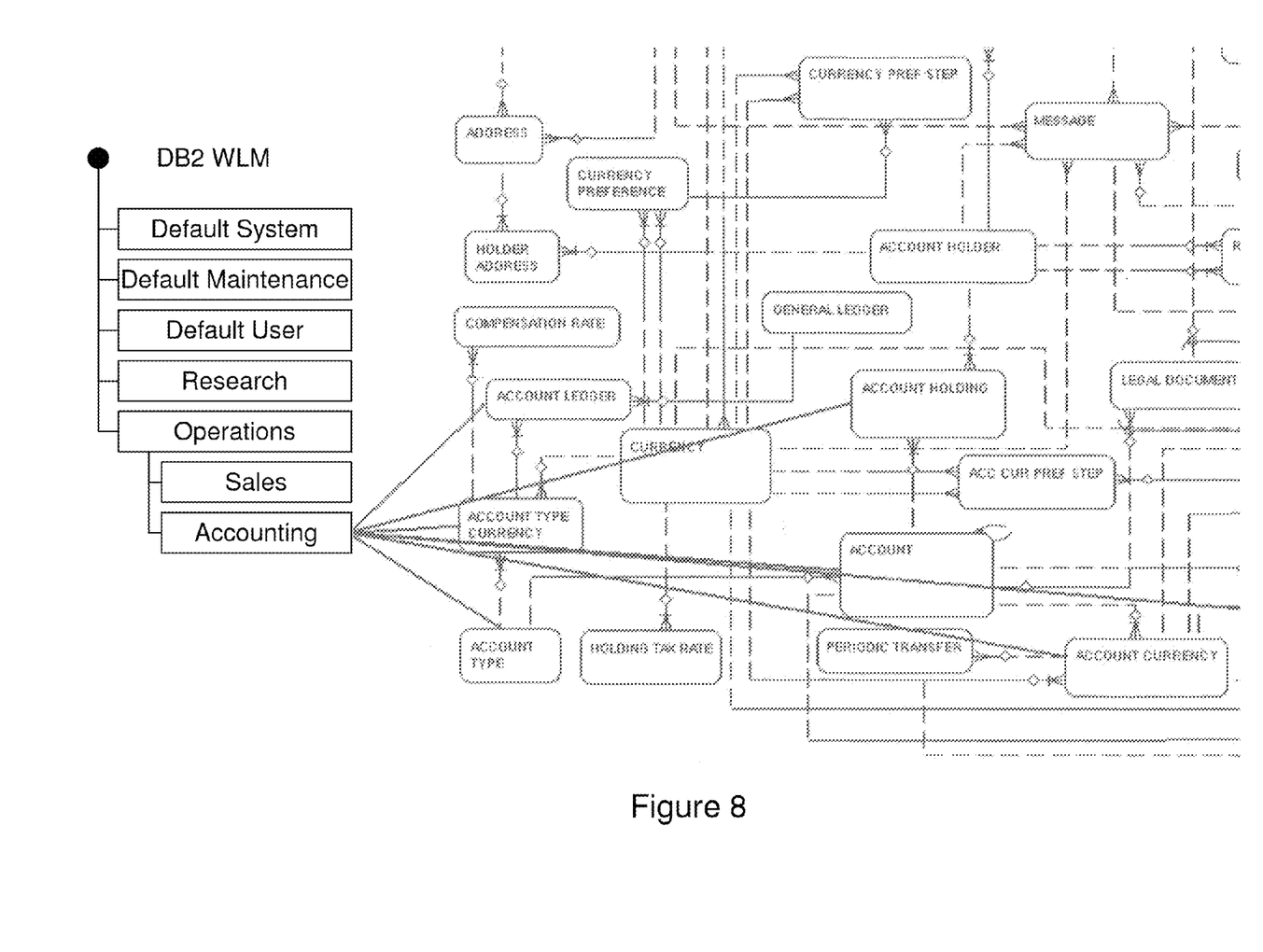
FIG. 8 is an example data map of an example workload rebalancing method.

Referring to FIG. 8, an example data map shows associations of an accounting service class. The example shows a structure list of service classes defined in IBM DB2 V10.1 WLM: default system service class; default maintenance service class; research service class and operations service class. Within the operations service class are a sale service sub-class and an accounting service sub-class. To the right of the services classes is an example banking data model. The lines from the accounting service sub-class box shows associations found by an exemplary embodiment with tables including: an account ledger table; an account type currency table; an account type table; and an account table.

An exemplary embodiment allows a database administrator (DBA) to enable a transparent migration of the identified data to appropriate disk storage on a class by class basis. For example, using the above WLM classes, a DBA may configure the account service sub-class as a high priority workload class; data that the accounting service sub-class interacts with are automatically migrated to faster disk storage as it is identified. The association of service sub-class activities tied to specific underlying data can be achieved through monitoring capabilities within DB2.

An exemplary embodiment identifies all data accessed through the accounting service sub-class and transparently migrates such data to faster disk storage. An exemplary embodiment identifies the associated accounting tables and calls database migration logic 204. The movement is a background task and allows continued access to the data as it is moved.

Use Cases. Given the fact that WLM rules are setup and governed by the DBA the following use cases are hypothetical implementations of the embodiments with possible beneficial impact.

Use Case 1: End of Month Financial Reporting. A DBA configures WLM to treat the data accessed by the financial reporting application preferentially and the underlying data are migrated transparently to faster high speed disk storage. When the end of month financial statements/reports are produced all queries and reports are generated significantly faster due to the increased I/O performance times.

Use Case 2: End of Quarter Sales Figures. A DBA configures WLM to treat the data accessed by the Sales Director preferentially and the underlying data are migrated transparently to faster high speed disk storage. When the Sales Director generates sales reports approaching quarter end (to identify any outstanding deals to be closed) and post quarter end to identify all sales completed, the reports are significantly quicker to produce due to enhanced performance times from faster high speed disk storage.

Use Case 3: Bulk Load. A DBA has configured WLM to treat data accessed by certain types of workload (in this case load) preferentially. This type of use case can be attributable to any organization or business domain that has the need to load data in bulk, for example, commercial banking application receiving periodic updates from international banking. The underlying data are migrated transparently to faster high speed disk storage. The end result is the load operation is completed significantly faster and the data are available for end user consumption much quicker.

Further aspects are now described.

A computer program aspect of an exemplary embodiment for use with a computer system comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A data carrier aspect of an exemplary embodiment comprises functional computer data structures to, when loaded into a computer system and operated upon thereby, enable the computer system to perform all the steps of the method. A suitable data-carrier could be a solid-state memory, magnetic drive or optical disk. Channels for the transmission of data may likewise comprise storage media of all descriptions as well as signal-carrying media, such as wired or wireless signal-carrying media.

Further embodiments are now described.

It will be clear to one of ordinary skill in the art that all or part of the logical process steps of an exemplary embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of an exemplary embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, an aspect may be realized in the form of a computer implemented method of deploying a service comprising steps of deploying computer program code operable to, when deployed into a computer infrastructure and executed thereon, cause the computer system to perform all the steps of the method.

It will be appreciated that the method and components of exemplary embodiments may be embodied fully or partially in a parallel computing system comprising two or more processors for executing parallel software.

Figure 9:
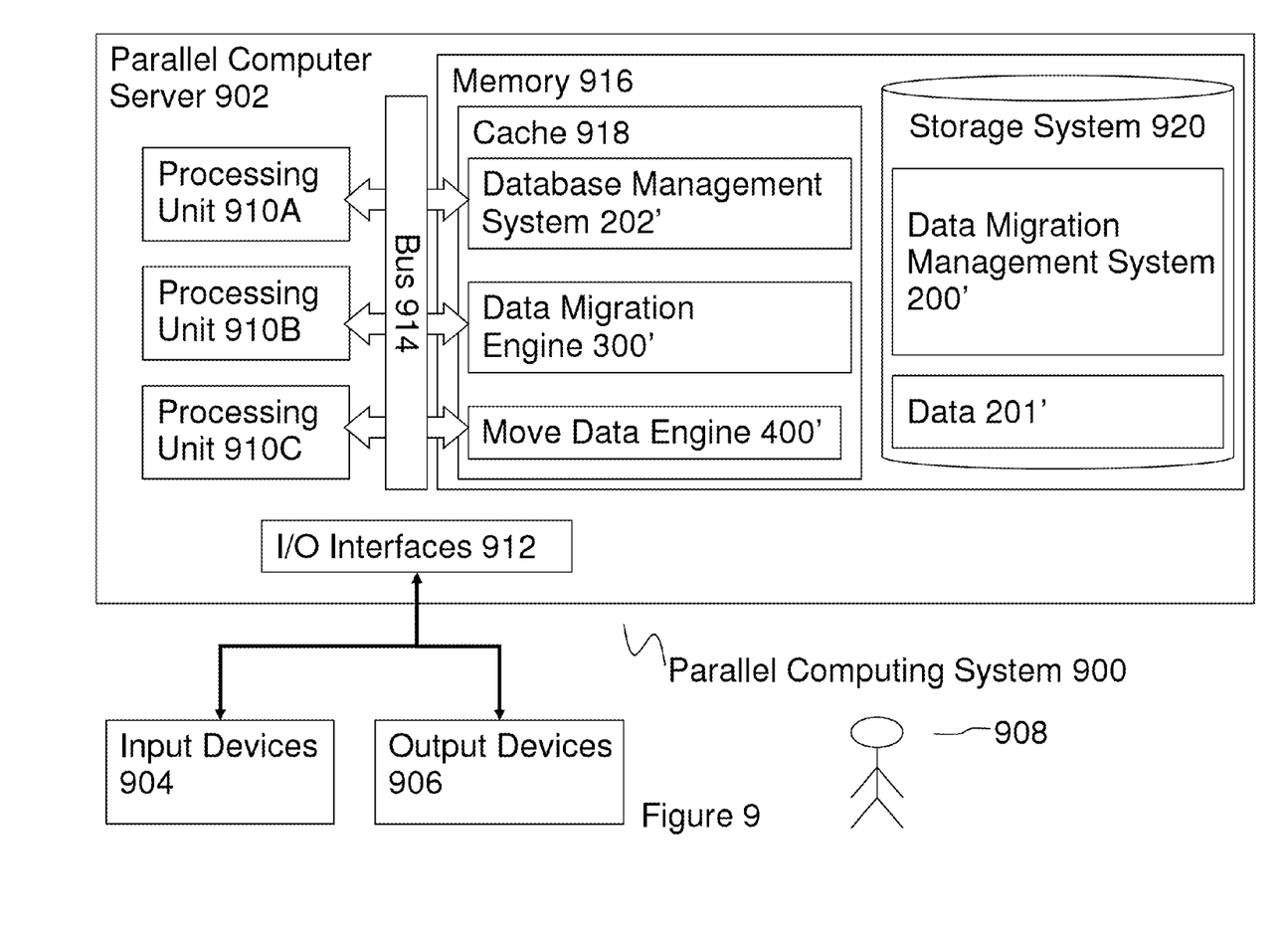
FIG. 9 is a deployment diagram of a parallel computing embodiment.

Referring to FIG. 9, an example parallel computing embodiment comprises parallel computing system 900 with three processing units 910A, 910B and 910C for parallel processing of instructions. Parallel computing system 900 may be described in the general context of parallel computer system executable instructions, such as parallel program modules, being executed by parallel computing system 900. Generally, parallel program modules may include routines, programs, objects, components, logic, data structures, that perform particular tasks or implement particular abstract data types. Parallel computing system 900 comprises: parallel computer server 902; input devices 904; and output devices 906. User 908 provides input and receives output from the parallel computing system 900. Parallel computer server 902 comprises: processing units 910A, 910B, 910C; input output (I/O) interfaces 912; bus 914 and memory 916.

I/O interfaces 912 provide the gateway between the parallel computer server 902 and input devices 904 and output devices 906.

Bus 914 represents one or more of any of several types of bus structures, including a memory bus or memory controller, a peripheral bus, an accelerated graphics port, and a processor or local bus using any of a variety of bus architectures.

Memory 916 includes computer system readable media in the form of volatile memory, such as random access memory (not shown), non-volatile or persistent storage 920; and cache memory 918.

In a parallel computing embodiment, program modules comprise data migration management system 200' and data 201'. Data migration management system 200' and data 201' are stored in storage system 920, by way of example and not limitation, as well as an operating system, one or more application programs, a database management system and other program modules. Each of the operating system, one or more application programs, other program modules, and program data or some combination thereof, may include an implementation of a networking environment. Data migration management system 200' is provided to carry out the functions and/or methodologies of the embodiments in a parallel environment as described herein. Data 201' are provided to carry example data for the embodiments as described herein.

Data migration management system 200' comprises three autonomous parts: database management system 202'; data migration engine 300' and move data engine 400'. In operation, these three parts are extracted from storage system 920 and loaded into cache memory 918 so that they may be executed by the processing units.

Database management system 202' corresponds to database engine 202; database migration logic 204; and workload manager 206 of an exemplary embodiment. Essentially database management system 202' is a generic database management system.

Data migration engine 300' corresponds to data migration engine 300 of an exemplary embodiment but without the move tagged data method 400.

Move data engine 400' corresponds to the move tagged data method 400 of an exemplary embodiment.

In the parallel processing embodiment, the three autonomous parts 200', 300' and 400' are processed in parallel by respective parallel processing units 910A, 910B and 910C.

Parallel computer system 900 communicates with input devices 904 and output devices 906 via I/O interface 912. Input devices 904 can include a keyboard, a pointing device, a scanner and any device converting user input to signal data. Output devices 906 include a display, printer, speaker or any device converting signal data to output for the user.

In this example three processing units are shown but two or more than three could be used to build a parallel embodiment. In the described parallel computing embodiment the parallel computer server 902 comprises multiple processing units. In an alternative parallel computing embodiment, a parallel computer server comprises a single processor having multiple cores. In a first virtual parallel computing embodiment, a computer server comprises a virtual computing environment and virtual parallel processing units. In a second virtual parallel computing embodiment a computer server comprises a virtual computing environment having a virtual processing unit with multiple virtual cores. Further embodiments can comprise combinations of real and virtual parallel processing units and real and virtual parallel processing cores.

Viewed from a first aspect, an exemplary embodiment provides a method for managing a database in real-time comprising: scanning for predetermined data in a predetermined workload stream during real-time operation of the database; determining a workload priority for located predetermined data according to one or more workload rules; determining a storage priority of located predetermined data according to a physical location of the located predetermined data; and moving the located predetermined data during the real-time operation of the database to different physical location if the storage priority and the workload priority do not match.

An exemplary embodiment provides a method wherein moving the located predetermined data comprises tagging the located predetermined data for movement.

An exemplary embodiment provides a method wherein movement of the located predetermined data is postponed if new physical storage has less than a threshold space.

An exemplary embodiment provides a method wherein the located predetermined data are moved to a higher priority physical location to match its determined workload priority.

An exemplary embodiment provides a method wherein the located predetermined data are moved to a lower priority physical location to match its determined workload priority.

An exemplary embodiment provides a method wherein the movement of the located predetermined data is performed asynchronously to the scanning and determining steps.

An exemplary embodiment provides a method wherein the data are prioritized in multiple categories.

An exemplary embodiment provides a method wherein the unit of data that is assigned a priority is a table.

An exemplary embodiment provides a method wherein groups of tables can be assigned the same priority.

Viewed from a second aspect, an exemplary embodiment provides a database management system comprising: a workload stream scanner for scanning for predetermined data in a predetermined workload stream during real-time operation of the database; a workload priority engine for determining a workload priority for located predetermined data according to one or more workload rules; a storage priority engine for determining a storage priority of located predetermined data according to a physical location of the located predetermined data; and data migration engine for moving the located predetermined data during the real-time operation of the database to different physical location if the storage priority and the workload priority do not match.

An exemplary embodiment provides a system wherein moving the located predetermined data comprises tagging the located predetermined data for movement.

An exemplary embodiment provides a system wherein movement of the located predetermined data is postponed if new physical storage has less than a threshold space.

An exemplary embodiment provides a system wherein the located predetermined data are moved to a physical location with a higher priority or lower priority to match its determined workload priority.

Viewed from a third aspect, an exemplary embodiment provides a computer program product for managing a database, the computer program product comprising computer readable recording medium having computer readable code stored thereon for performing the method of any one of claims as described above.

Viewed from a fourth aspect, an exemplary embodiment provides a computer program stored on a computer readable medium and loadable into the internal memory of a digital computer, comprising software code portions, when the program is run on a computer, for performing the method as described above.

The embodiments allow a database administrator to apportion preferential treatment of data for those users, applications or workloads that have been deemed higher priority within the workload manager. This data will be transparently migrated from slower storage to faster storage, if available, as defined in the database management system. Typical access time for a flash-based solid-state drive (SSD) is about 35 to 100 micro-seconds whereas that of a rotating magnetic disk is 5,000 to 10,000 micro-seconds; migration of data from rotating magnetic disk to SSD would enhance data access speed by a factor of a hundred. Any data deemed to be of lower priority within the workload manager, and currently residing on faster storage, will be migrated automatically back to slower storage to save on resources.

The embodiments allow real-time and automatic migration of data accessed by higher priority users, batches or applications into faster storage and data accessed by lower priority users, batches or applications into slower storage thereby reducing average response times and increasing performance for higher priority workloads. The located predetermined data are moved to a different physical location in real time. The movement of data is a direct logical consequence of the scanning for predetermined data and there is no human intervention.

The embodiments provide: increased performance in a relational database management system; reduced manual administrative tasks for the database administrator; real-time movement of data based off workload manager prioritization defined by the database administrator; and more efficient use of expensive higher performing storage capacity.

The initiating and migrating data in real-time operates at the machine level in a computer system so that it is transparent to application level and other system operations. The embodiments result in new machine level operations by initiating migration of priority data to or from corresponding priority persistent storage whereby such machine level operation has not occurred before with prior art data management controllers. The embodiments result in new machine level operations by managing both initiation and migration in real-time of priority data to or from corresponding priority persistent storage whereby such machine level operations have not been disclosed by prior art data management controllers. The effect of migration initiation of data leads to an increase in reliability of machine level operations since data are systematically migrated and does not wait for computer administrator decisions. The effect of migration initiation and real-time migration of the data leads to an increase in speed for machine level operations since both processing data has a systematic migration and does not wait for computer administrator decisions.

Moving the located predetermined data comprises tagging the located predetermined data for movement thereby allowing for asynchronous migration so that there is no interference with other machine level operations. Movement of the located predetermined data is postponed if new physical storage has less than a threshold space thereby allowing subsequent movement of data to occur and improve system performance until the postponed movement has enough space to move. Each of the above features operates at the machine level in the computer system so that they are transparent to application level and other system operations. The above features are new machine level operations that have not occurred before with contemporary data management controllers.

It will be clear to one skilled in the art that many improvements and modifications can be made to the foregoing exemplary embodiment without departing from the scope of the present invention.

What is claimed is:

1. A computer implemented method for managing a database in real-time comprising:
   scanning for predetermined data in a predetermined workload stream during real-time operation of the database;
   determining a workload priority for located predetermined data according to one or more workload rules, wherein the one or more workload rules determine the workload priority based upon a service class of the predetermined data;
   determining a storage priority of located predetermined data according to a physical location of the located predetermined data; and
   moving the located predetermined data during the real-time operation of the database to a different physical location if the storage priority and the workload priority do not match, wherein movement of the located predetermined data is postponed if new physical storage has less than a threshold space.

2. The method according to claim 1 wherein moving the located predetermined data comprises tagging the located predetermined data for movement.

3. The method according to claim 1 wherein the located predetermined data are moved to a higher priority physical location to match its determined workload priority.

4. The method according to claim 1 wherein the located predetermined data are moved to a lower priority physical location to match its determined workload priority.

5. The method according to claim 1 wherein the movement of the located predetermined data is performed asynchronously to the scanning and determining.

6. The method according to claim 1 wherein the data are prioritized in multiple categories.

7. The method according to claim 1 wherein the unit of data that is assigned a priority is a table.

8. The method according to claim 7 wherein groups of tables can be assigned the same priority.

9. A database management system, comprising:
   a workload stream scanner in memory of a computer processing system comprising instructions executable by a processor of the computer processing system to scan for predetermined data in a predetermined workload stream during real-time operation of a database;

a workload priority engine in memory of the computer processing system comprising instructions executable by the processor of the computer processing system to determine a workload priority for located predetermined data according to one or more workload rules, wherein the one or more workload rules determine the workload priority based upon a service class of the predetermined data;

a storage priority engine in memory of the computer processing system comprising instructions executable by the processor of the computer processing system to determine a storage priority of located predetermined data according to a physical location of the located predetermined data; and a data migration engine in memory of the computer processing system comprising instructions executable by the processor of the computer processing system to move the located predetermined data during the real-time operation of the database to a different physical location if the storage priority and the workload priority do not match, wherein movement of the located predetermined data is postponed if new physical storage has less than a threshold space.

10. The system according to claim 9 wherein movement of the located predetermined data comprises tagging the located predetermined data for movement.

11. The system according to claim 9 wherein the located predetermined data are moved to a physical location with a higher priority or lower priority to match its determined workload priority.

12. The system according to claim 9 wherein the movement of the located predetermined data is performed asynchronously to scanning and determining by the workload stream scanner, the workload priority engine, and the storage priority engine.

13. The system according to claim 9 wherein the data are prioritized in multiple categories.

14. A computer program product for managing a database, the computer program product comprising a non-transitory computer readable storage medium having computer readable program code embodied therewith, the computer readable program code comprising computer readable program code configured for:

scanning for predetermined data in a predetermined workload stream during real-time operation of the database;

determining a workload priority for located predetermined data according to one or more workload rules, wherein the one or more workload rules determine the workload priority based upon a service class of the predetermined data;

determining a storage priority of located predetermined data according to a physical location of the located predetermined data; and moving the located predetermined data during the real-time operation of the database to a different physical location if the storage priority and the workload priority do not match, wherein movement of the located predetermined data is postponed if new physical storage has less than a threshold space.

15. The computer program product according claim 14 wherein moving the located predetermined data comprises tagging the located predetermined data for movement.

16. The computer program product according claim 14 wherein the located predetermined data are moved to a physical location with a higher priority or lower priority to match its determined workload priority.

17. The computer program product according claim 14 wherein the movement of the located predetermined data is performed asynchronously to scanning and determining by a workload stream scanner, a workload priority engine, and a storage priority engine.

18. The method according to claim 1 wherein the located predetermined data is subsequently moved after the movement has been postponed based on determining that the new physical storage is greater than or equal to the threshold space.

19. The system according to claim 9 wherein the located predetermined data is subsequently moved after the movement has been postponed based on determining that the new physical storage is greater than or equal to the threshold space.

20. The computer program product according to claim 14 wherein the located predetermined data is subsequently moved after the movement is postponed based on determining that the new physical storage is greater than or equal to the threshold space.

* * * * *